F. C. HAYNES.
LAWN MOWER SHARPENER.
APPLICATION FILED OCT. 29, 1910.
1,000,334.
Patented Aug. 8, 1911.
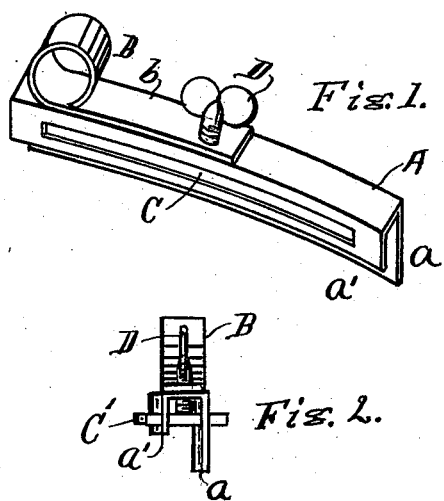
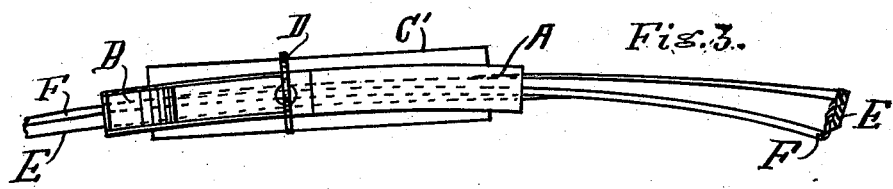
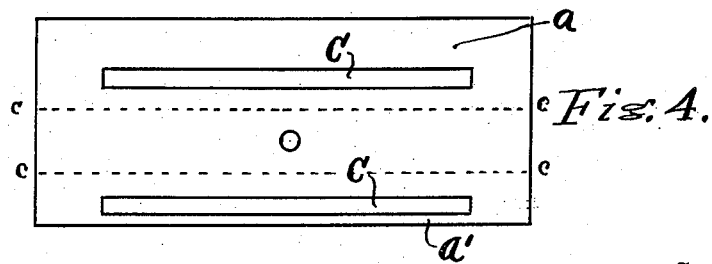
Witnesses
Louis Cilley
Roy L. Dahlman
Inventor
Fred C. Haynes
Ithiel J. Cilley
Attorney
By
COLUMBIA PLANOGRAPH CO., WASHINGTON, D. C.

UNITED STATES PATENT OFFICE.

FRED C. HAYNES, OF GRAND RAPIDS, MICHIGAN, ASSIGNOR, BY DIRECT AND MESNE ASSIGNMENTS, TO RICHARD VAN BOCHOVE, OF GRAND RAPIDS, MICHIGAN.

LAWN-MOWER SHARPENER.

1,000,334.      Specification of Letters Patent.      Patented Aug. 8, 1911.

Application filed October 29, 1910. Serial No. 589,795.

*To all whom it may concern:*

Be it known that I, FRED C. HAYNES, a citizen of the United States, residing at Grand Rapids, in the county of Kent and State of Michigan, have invented certain new and useful Improvements in Lawn-Mower Sharpeners, of which the following is a specification.

My invention relates to improvements in appliances for sharpening lawn mower knives, and its objects are: first, to provide a lawn mower sharpener that may be easily and readily applied to the knives without removing the knives from the cylinders, and, second, to provide a lawn mower sharpener that may be carried in the pocket without inconvenience, and may be readily used by any one to sharpen the knives in the lawn without removing them to a shop or other place where an expert knife sharpener may be found. I attain these objects by the mechanism illustrated in the accompanying drawing in which—

Figure 1 is a perspective of the sharpener frame, or the implement that carries the sharpening element, as a file, an emery plate, &c. Fig. 2 is an end view of the same showing a sharpening element in place. Fig. 3 is a plan of the sharpener showing how it is placed upon the knife for sharpening the same, and Fig. 4 is a plan of a blank from which the sharpener frame is made.

Similar letters refer to similar parts throughout the several views.

In this implement the frame A that carries the sharpening element is made of thin sheet steel, or other suitable metal, which is blanked out substantially as shown in Fig. 4, said blank being provided with two slots, C C, that reach nearly the entire length of the blank. One of these slots is formed very near the edge of the blank and the other is located some distance from the other edge of the blank, practically as shown, so that when the blank is bent down upon the lines *c c* of Fig. 4, the side *a* will extend considerably beyond the side *a'*. The object of this construction is to form a sufficient bearing at *a*, upon the back or outside surface of the knife F, to enable the operator to hold the sharpener firm and steady and with sufficient space below the side *a'* so that it will not bear upon or interfere with the rib E of the knife cylinder, to which the knife is secured.

As the knife, F, of a lawn mower is formed diagonally of the cylinder, hence upon the segment of a circle or long screw form, it is necessary to form the body A of the sharpener frame upon a curve, longitudinally, so that it will readily and conveniently follow the curve of the knife, and for this purpose I offset the frame laterally, to form a perfect curve the entire length of the frame.

The slots C C are formed to receive the sharpening element, as a file, or emery plate C', hence they must be perfectly parallel and upon the same plane relative to the top of the frame, and the said sharpening element, shown at C' in Figs. 2 and 3, is passed through said slots and is held to place by means of a properly applied thumb screw, as D, that passes through the back of the frame A, and, if desired, through the body *b* of the handle B.

What I claim as new, and desire to secure by Letters Patent of the United States, is:

1. In an implement for sharpening lawn mower knives, a sheet metal body of channel form, one side of said channel being made narrower than the other side and the two sides having parallel slots through them, and a handle, a sharpening element supported in the slots by passing through both slots edgewise and a set screw for holding the sharpening element in the frame.

2. In an implement for sharpening lawn mower knives, a sheet metal body made channel form, one side of said channel being narrow and one side thereof being wide, said sides having parallel slots, a sharpening element supported in said slots by passing through both slots edgewise, said body curved laterally, a set screw for holding the sharpening element and a handle secured to the body.

Signed at Grand Rapids, Michigan, October 18, 1910.

FRED C. HAYNES.

In presence of—
    I. J. CILLEY,
    R. L. WILLIAMS.

Copies of this patent may be obtained for five cents each, by addressing the "Commissioner of Patents, Washington, D. C."